United States Patent
Mesika

(10) Patent No.: US 11,959,640 B2
(45) Date of Patent: Apr. 16, 2024

(54) HOLIDAY SHABBAT IGNITOR

(71) Applicants: Moshe Yishay Mesika, Netanya (IL); David Elie Brahim, Netanya (IL); David Rahamim, Netanya (IL)

(72) Inventor: Moshe Yishay Mesika, Netanya (IL)

(73) Assignee: David Elie Brahim, Netanya (IL)

( * ) Notice: Subject to any disclaimer, the term of this patent is extended or adjusted under 35 U.S.C. 154(b) by 463 days.

(21) Appl. No.: 17/331,779

(22) Filed: May 27, 2021

(65) Prior Publication Data

US 2021/0388987 A1 Dec. 16, 2021

Related U.S. Application Data

(60) Provisional application No. 63/037,639, filed on Jun. 11, 2020.

(51) Int. Cl.
| | | |
|---|---|---|
| *F23Q 7/14* | (2006.01) | |
| *F23Q 7/22* | (2006.01) | |
| *G05B 19/045* | (2006.01) | |

(52) U.S. Cl.
CPC .............. *F23Q 7/14* (2013.01); *F23Q 7/22* (2013.01); *G05B 19/045* (2013.01); *G05B 2219/23043* (2013.01); *G05B 2219/23258* (2013.01)

(58) Field of Classification Search
None
See application file for complete search history.

(56) References Cited

U.S. PATENT DOCUMENTS

| | | | |
|---|---|---|---|
| 4,198,576 A | 4/1980 | Staton | |
| 6,066,837 A | 5/2000 | McCormick et al. | |
| 6,703,591 B2 | 3/2004 | Daum et al. | |
| 8,067,706 B2 | 11/2011 | Tukachinsky | |
| 9,734,961 B2 | 8/2017 | Johncock et al. | |
| 10,876,742 B2 | 12/2020 | Tadmor | |
| 2012/0181266 A1 | 7/2012 | Frommer | |
| 2012/0214107 A1* | 8/2012 | Al Gharib | ............... F23Q 2/325 431/13 |
| 2016/0213187 A1 | 7/2016 | Meusburger et al. | |
| 2017/0227219 A1* | 8/2017 | Tijerina | .................... F23Q 7/16 |

FOREIGN PATENT DOCUMENTS

| | | |
|---|---|---|
| IL | 275595 | 12/1994 |
| IL | 275595 | 7/2020 |

OTHER PUBLICATIONS https://www.kosherswitch.com/live/tech/how.

\* cited by examiner

*Primary Examiner* — Steven B McAllister
*Assistant Examiner* — John E Bargero

(57) ABSTRACT

An aspect of some embodiments of the current invention relates to a device, that may ignite a substance without the user directly causing the ignition. for example, the device may perform ignition in a manner that does not transgress Jewish religious prohibitions, for example the Jewish religious law prohibits kindling a flame on the Sabbath and/or festivals. In some cases, kindling may be permitted in an indirect manner referred to in Jewish law by the Aramaic term "Grama". For example, the device may be designed to ignite a cigarette. Optionally, the device may be designed to be carried safely in a pocket. In some embodiments, the device may initiate ignition without direct user action and/or the initial ignition may be used to ignite another object in accordance with Jewish law allowing transfer of fire but prohibiting starting of a new fire on a holiday.

20 Claims, 6 Drawing Sheets

HOLIDAY SHABBAT IGNITOR

RELATED APPLICATION/S

This application claims the benefit of priority under 35 USC § 119(e) of U.S. Provisional Patent Application No. 63/037,639 filed 11 Jun. 2020, the contents of which are incorporated herein by reference in their entirety.

FIELD AND BACKGROUND OF THE INVENTION

An aspect of some embodiments of the current invention relates to a device, referred to herein as the ignition device, that is operated by a user and may ignite a substance without the user directly causing the ignition.

U.S. Pat. No. 8,669,501 appears to disclose, "A cooking appliance control system for use during the Jewish Holidays or Sabbath. A timer is in communication with the oven heater element programmed to provide for scheduled activations and deactivations of the element during the Holidays. Prior to the Holiday the timer is programmed, the oven is activated to the predetermined temperature, and the timer program is then activated to provide for activation of the heater element to the predetermined temperature and deactivation in accordance with the schedule during the Holiday. Additionally, a switch selectively activates and deactivates the ignition circuits of the burners. This permits, one of the gas burner heater elements to be lighted by the appliance before the Holiday when the ignition circuits are activated to provide a flame to light the other burners when the ignition circuits are deactivated during the Holiday."

U.S. Pat. No. 8,067,706 appears to disclose, "A control device (timer) enabling activation of electric appliances for a required time period at Saturday and Holyday within the frame of Jewish religious law" . . . "The timer comprises a first timing device, activating the appliance from time to time for a short period, and then deactivating it, and a second timing device, which, when activated manually or at any other way, delays the appliance deactivation by the first timing device for a required time period, and so makes the appliance usable for this period, beginning from the nearest initiation thereof by the first timing device. The timer can be a stand alone device or built into the appliance."

U.S. Pat. No. 4,198,576 appears to disclose that a, "unit interrupts normal operation of an electrical circuit energized in cycles by a time clock, for one of the cycles. The unit includes a first means actuable by means of a switch for bypassing the control circuit, at any time when it is desired to interrupt normal operation of the circuit during the next cycle. A second means for bypassing the first means does so if the circuit is energized at the time the switch is closed. A third means bypasses the control circuit when the second means is not actuated and the circuit is not in operation. The second bypassing means turns off if it is on when the time clock next turns off. The third bypassing means turns on when the time clock turns on again, and it returns the circuit to normal operation when the time clock turns off once again."

U.S. Pat. No. 6,703,591 appears to disclose "an apparatus control system" . . . "configured to operate an appliance in at least a normal mode and a holiday mode wherein normal mode operation of appliance feature elements is altered to better conform to religious customs, such as Orthodox Jewish customs. In response to user manipulation of a control interface panel, the control system is configured to enter the holiday mode upon user manipulation of the control interface panel with a designated key sequence. When in the holiday mode, response to user manipulation of the control interface panel is delayed for a randomly determined time, and appliance features of the normal mode that violate religious custom are disabled."

US Patent Publication no. 20160213187 appears to disclose, "A method for operating an appliance. The method includes establishing a current date and time of day and automatically shifting the appliance to a Sabbath operating mode when the current date and time of day is Sabbath. A related appliance having a controller that is configured for automatically shifting the appliance to a Sabbath operating mode when a current date and time of day of a clock corresponds to Sabbath is also provided."

U.S. Pat. No. 6,066,837 appears to disclose, "A method and apparatus for controlling a cooking apparatus operates at least one cooking energy source with a control including switches that reduce the input manipulations required by a user and responses to component manipulations in order to operate one or more of the cooking energy sources to complete a cooking operation. The control responds to a first selection of the Sabbath operating mode and responds to a second selection for setting a first cooking source and at least one related feature function. An actuator maintains the performance status of the cooking energy source and the related feature, and disables the selectors during maintained performance."

U.S. Pat. No. 9,734,961 appears to disclose that, "An appliance includes a position switch retention device for use with an appliance includes a body defining a generally cylindrical profile extending through a first portion thereof along an axis and having a first radius. The body further defines a pin-receiving channel open on at least a first end thereof and positioned within the generally cylindrical profile. The device further includes a first tab extending from a side of the body. The tab defines a ramp and an edge with the ramp extending away from the first end of the body to the edge. A cap extends outwardly from a second end of the body opposite the first end. The cap is spaced apart from the edge of the tab at a first distance and has a second radius greater than the first radius."

U.S. patent Ser. No. 10/876,742 appears to disclose that, "A water heating control system has a tank for holding a volume of water heated by a heater and having a hot water outlet and a cold water inlet connected to a main water supply whereby hot water removed from the hot water outlet is replenished with cold water. A temperature sensor provides a temperature signal indicative of water temperature in the tank, and a control unit monitors the water temperature based on the temperature signal and is responsive to selection of a Sabbath mode of operation for periodically actuating and de-actuating the heater while maintaining an average water temperature to less than a permitted preset threshold. In Sabbath mode the control unit closes a shut off valve connected to the water inlet when the heater is actuated and opens the shut off valve when the heater is not actuated."

Additional background art includes Israeli patent application no. 111329, Israeli patent application no. 275595,

SUMMARY OF THE INVENTION

According to an aspect of some embodiments of the invention, there is provided a system for ignition including: an ignitor configured to ignite an object when the object is brought into proximity of the ignitor while the ignitor is in an activated state; an energy source for supplying energy to the ignitor to reach activated state; a shielding housing the ignitor and the energy source, the shielding having a closed configuration inhibiting bringing the object into proximity with the ignitor; a logic controller configured for activating the ignitor according to a preprogrammed schedule.

According to some embodiments of the invention, the ignitor is configured for activation regardless of whether the shielding is in the configuration or the closed configuration.

According to some embodiments of the invention, the logic controller is configured for the activating in accordance with the schedule regardless of where the shielding is in an open configuration facilitating bringing the object into proximity with the ignitor or closed configuration.

According to some embodiments of the invention, the logic controller is configured for repeated the activating and deactivating the ignitor in accordance with the schedule over a period of 24 hours without intervention of a user.

According to some embodiments of the invention, the object is a tip of a cigarette.

According to some embodiments of the invention, the shielding includes an indentation and wherein the ignitor is locating inside the indentation.

According to some embodiments of the invention, the shielding includes a cover and where in the closed configuration the cover blocks an opening of the indentation and wherein in an open configuration inhibiting bringing the object into proximity with the ignitor the cover allows access to the ignitor via the opening.

According to some embodiments of the invention, the system further includes: an output interface configured for informing a user of a preprogrammed ignition event before the ignition event.

According to some embodiments of the invention, the logic controller is configured for performing the activating when the shielding is in an open configuration inhibiting bringing the object into proximity with the ignitor and for inhibiting the activating when the shielding is in the closed configuration.

According to some embodiments of the invention, the logic controller is configured for at least two modes, a first mode wherein the schedule is preprogrammed and a second manual state where the activating is according to a current action of a user.

According to some embodiments of the invention, in the manual state opening the shielding activates the ignitor and closing the shielding deactivates the ignitor.

According to some embodiments of the invention, the system further includes a trigger and wherein in the manual state activating the trigger activates the ignitor and deactivating the trigger deactivates the ignitor.

According to some embodiments of the invention, the system further includes a trigger and wherein the logic controller is configured for performing the activating when the trigger is activated and for inhibiting the activating when the trigger is not activated.

According to some embodiments of the invention, the ignitor includes a plasma source.

According to some embodiments of the invention, the shielding is sized and shaped to fit into a pocket of a user.

According to some embodiments of the invention, the system further includes an input interface configured for a user to program the schedule.

According to an aspect of some embodiments of the invention, there is provided a method of igniting in accordance with Jewish law on a Jewish holiday including: supplying an ignition system including an ignitor and a shielding in a closed state inhibiting access of an object for igniting by the ignitor; preprogramming the ignition system for repeatedly activating and deactivating an ignitor over the holiday according to a schedule preprogrammed before the holiday; opening the shielding during the holiday to facilitate the access; igniting the object during the holiday while the shielding is open and the ignitor is activated according to the schedule.

According to some embodiments of the invention, the method further includes inhibiting the activating when the shielding is in a closed state and facilitating the activating when the shielding is in an open configuration inhibiting bringing the object into proximity with the ignitor.

According to some embodiments of the invention, the method further includes closing the shielding while the ignitor is activated and wherein the activator remains activated while the shielding is in the closed state after the closing.

According to some embodiments of the invention, the system includes a trigger and further including inhibiting the activating when the trigger is deactivated and facilitating the activating when the trigger is activated.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Overview

Figure 1:
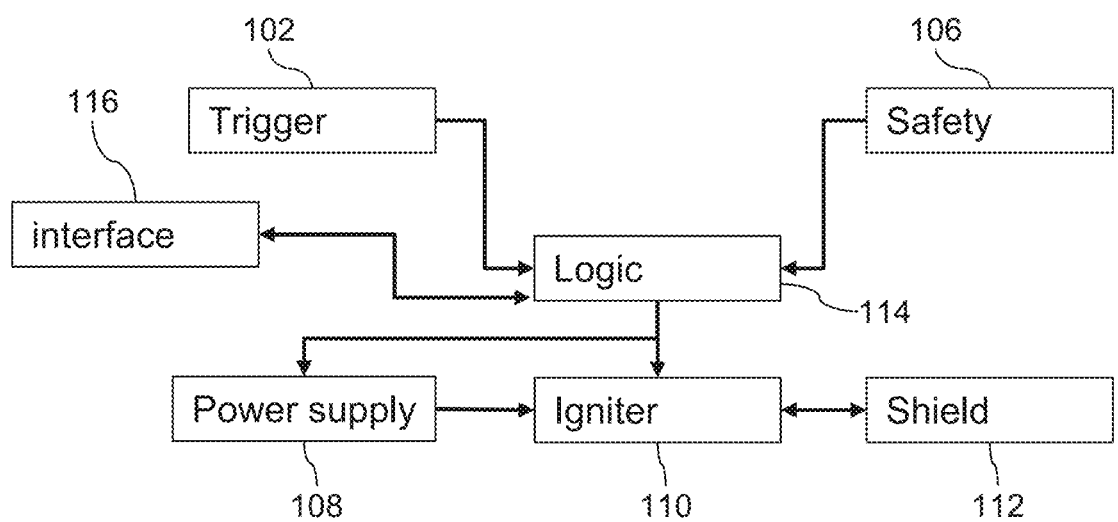
FIG. 1 is a block diagram of an ignition device in accordance with an embodiment of the current invention.

The present invention, in some embodiments thereof, relates to a device for igniting, and more particularly, but not exclusively, to a device which may cause ignition without direct action by the user.

An aspect of some embodiments of the current invention relates to a device, referred to herein as the ignition device, that is operated by a user and may ignite a substance without the user directly causing the ignition. The device optionally performs ignition in a manner that does not transgress Jewish religious prohibitions, for example the Jewish religious law prohibits kindling a flame on the Sabbath and/or festivals. In some cases, kindling may be permitted in an indirect manner referred to in Jewish law by the Aramaic term "Grama". For example, the device may be designed to ignite a cigarette. Optionally, the device may be designed to be carried safely in a pocket. In some embodiments, the device may initiate ignition without direct user action and/or the initial ignition may be used to ignite another object in accordance with Jewish law allowing transfer of fire but prohibiting starting of a new fire on a holiday.

Optionally, the ignition device may comprise a trigger, an element that causes ignition, referred to herein as the ignitor, and/or a logical controller, for example including a timing mechanism. Optionally, the ignitor is at least partially covered by a shield. Optionally, a safety mechanism prevents the ignition device from accidentally igniting other materials. Optionally, the ignition device further comprises a power supply, for example a battery. For example, the ignitor may be positioned within an indentation and/or covered by a cover. Optionally, an exterior of the lighter may be insulated and/or shielded from the ignitor.

Optionally, the ignitor may include a resistive wire, a spark generator, high voltage electrodes and/or any other type of mechanism for igniting combustible materials. For example, the ignitor may form an electrical arc, plasma and/or an electrically charged beam. Optionally, the ignitor may comprise at least two states, for example a deactivated state, wherein the ignitor may not cause ignition of materials, and an activated state, wherein the ignitor may cause ignition. Optionally, combustible materials may be ignited when placed in proximity to an ignitor in the activated state. Optionally, the timer may control the state of the ignitor, for example determining a duty cycle of activated state and deactivated state of the ignitor. Optionally, the trigger may control activation, for example when the trigger is not activated, the timer maintains the ignitor in the deactivated state irrespective of the duty cycle state, and/or when the trigger is activated, the timer may cause the ignitor to switch from deactivated state to the activated state, for example at the start of the next activation cycle (on state). In some embodiments, the duty cycle may have a random element for example the length of the cycle may be random (within some range) and/or some ignition cycles may be skipped randomly. Optionally, a user may activate the trigger and place a combustible material near the ignitor, in which case the timer will cause the ignitor to be energized by a power supply at some point in the future. In this manner the ignition device may cause combustion without direct action of the user, since the activation of the trigger by itself does not cause the ignitor to become energized.

In some embodiments, the lighter will have a clock and/or a timer. For example, the clock may designate standby times (for example at night) when the lighter is completely off and/or active times when the lighter activates periodically according to a duty cycle and/or any of the embodiments herein. Optionally, the lighter will include an indicator that tells a user the current state of the lighter, how long until the next activation/ignition period and/or approximately (for example within 1 second and/or within 1 to 10 seconds and/or within 10 to 60 seconds) how long until the next activation/ignition period.

In some embodiments, a single lighter may have different modes that may be selected by a user. For example, there may be a conventional manual mode (light on demand) for example for weekday mode. For example, there may be one or more holiday (YomTov) modes for example, a triggered (semi automatic) timed mode wherein activation is indirect (e.g., by a Grama as defined below) and/or untriggered (automatic) mode (e.g., where the lighter is activated periodically unconditionally for example as described in connection to FIG. 5).

EXEMPLARY EMBODIMENTS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
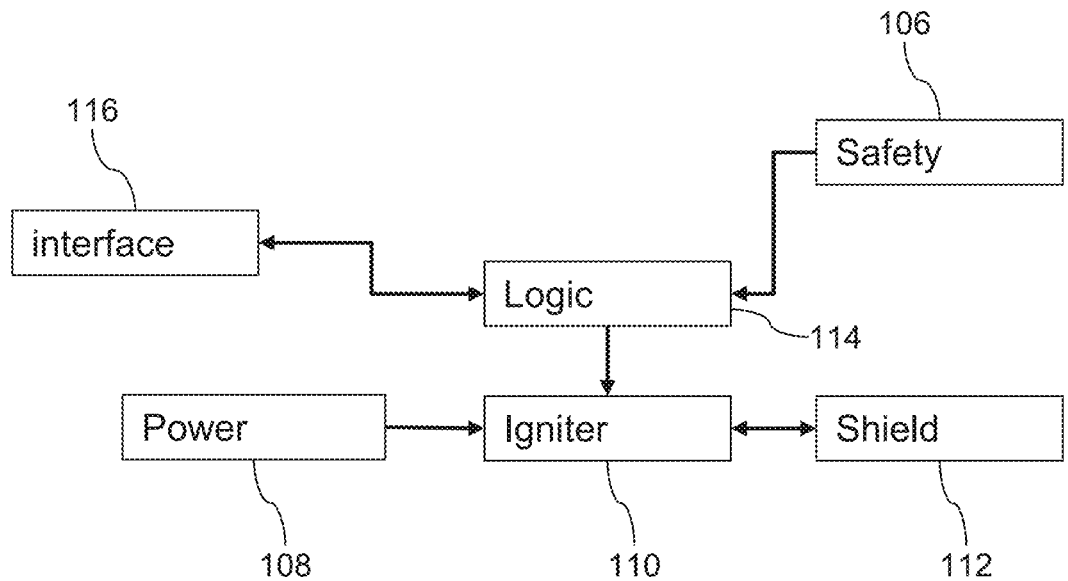
FIG. 2 is a block diagram of an ignition device in accordance with an embodiment of the current invention.

FIG. 1 is a block diagram of an ignition device using a logic controller 114 in accordance with an embodiment of the current invention. FIG. 2 is a block diagram of an ignition device using simplified logic in accordance with an embodiment of the current invention. In some embodiments, an ignition device comprises a trigger 102, a safety 106, an ignitor 110, a power supply 108, a logic controller 114 and/or a shield 112. Optionally, the shield may surround the ignitor 110 on one or more sides. Optionally, the shield 112 includes a window allowing access to the ignitor 110 and/or a cover. For example, the cover may reversibly cover the window.

In some embodiments of the present invention, the ignitor 110 may be energized, for example to heat up and/or to generate a spark and/or to generate a plasma according to inputs of the trigger 102, the safety 106, and/or the logic controller 114. When the ignitor 110 is energized, a user may ignite a material, for example a cigarette, by placing the material in proximity to the ignitor 110. In another embodiment of the invention, the energized ignitor 110 generate a spark which may ignite a flammable material, for example gas. Optionally, the ignition device comprises an on/off switch, which allows/prevents the power supply 108 to provide power to other components of the ignition device.

Optionally, the ignitor 110 is capable of being activated and/or deactivated with the shield of the device open and/or closed.

Power Supply

The power supply 108 may include any source of electrical power, for example a chemical battery (e.g., a rechargeable battery for example a Li-ion battery), a capacitor, a generator, and/or any other source of electrical power. The power supply 108 may supply electrical power to energize the ignitor according to the conditions described below. Alternatively or additionally, the power supply may include other energy sources.

Trigger

In some embodiments a lighting device may include a trigger 102. Optionally the trigger 102 comprises a mechanical device that reacts to a user action. For example, the trigger may transfer at least part of a force applied to the trigger to the logic controller 114, and/or power supply 108. Alternatively or additionally, the trigger 102 may transfer a signal to another component in response to a user action. The trigger 102 may include, for example, a lever, a button, a switch, a knob, a faucet, a handle, and/or any other type of device reacting to a human action and/or capable of transferring at least part of an applied force. Alternatively or additionally, the trigger 102 may include a touch sensitive surface and/or a capacitance sensitive element. In some embodiments, the device includes a power supply 108, a safety, and/or a logic controller 114. Alternatively or additionally, a portion of the shielding of the device may act as a trigger 102. For example, opening the shielding may activate the trigger 102. The trigger 102 may be activated when the trigger is stimulated (e.g., by force, touch, change in capacitance etc.), for example a force sufficient to activate the input interface of the timer, as described below. For example, a trigger 102 and/or a safety 106 switch may include a light sensitive sensor and/or a capacitance sensor. Optionally, the trigger 102 may be a device that transfers applied pressure for the duration of time that pressure is applied to the trigger. Optionally, the trigger 102 may include a switch and/or a separate switch may toggle states of the device. Optionally, the trigger 102 and/or the switch 106 may be shielded, for example to prevent inadvertent triggering.

Safety

In some embodiments, a lighter may include a safety 106. For example, a safety 106 may include a mechanical, electrical, and/or electronic device that prevents the ignitor 110 from activating. For example, the safety 106 may be sensitive to light and or touch and/or an electrical field (e.g., capacitance) and/or a force applied (for example a force applied to the trigger) and/or heat. For example, the safety 106 may interfere with the movement of the trigger 102 and/or may interfere with the transferring of force from the trigger 102 to the logic controller 114, and/or power supply 108, and/or may inactivate an electrical circuit necessary to the activation of the ignitor 110, and/or any other mechanism that prevents the ignitor 110 from becoming activated. For example, the safety 106 may be configured to prevent energizing the ignitor 110 when the ignition device is in a user's pocket. In some embodiments, the lighter may not include a timer and/or a trigger 102.

Optionally, activating the safety 106 may prevent the trigger from transferring a signal and/or force to the logic controller 114, input interface 116 and/or prevent the logic controller 114 from responding when the trigger 102 is activated and/or prevent the timer from outputting a signal.

Timer

In some embodiments of the present invention, the ignition device comprises a timing device, referred to herein as a timer. Optionally the timer is a part of the logic controller 114 which may comprise a timing mechanism and/or receive input for example from the trigger 102 and/or from the safety 106, and/or send output for example to the ignitor 110 and/or the power supply 108. Optionally, the logic controller 114 is a discrete component from the timer.

Optionally the timer may output via a mechanical, electrical, and/or electronic connection generate and/or output signals from the timer to the ignitor 110, logic controller 114, and/or the power supply 108.

Timing Mechanism

Optionally, the timing mechanism may comprise a mechanical, electrical, and/or electronic timing device. Optionally, the timing mechanism may output a signal correlated with a duty cycle of on state and off state. Optionally the duration of the on state and/or the off state may be 1-2 seconds, 2-4 seconds, 4-6 seconds, 6-8 seconds, 8-10 seconds, 10-15 seconds, 15-30 seconds, and/or longer than 30 seconds. Optionally, the off state may last longer than the on state for example to between 2 to 10 times as long and/or between 10 to 100 times as long and/or between 100 to 1000 times as long and/or between 0.1000 to 10000 times as long and/or between 10,000 to 100,000 times as long. For example, the off state may last between 1 minute to 30 minutes and/or between 30 minutes to 2 hours and/or between 2 hours to 12 hours. In some embodiments, the timer may be programmed according to times of day. For example, the ignitor 110 may be triggered more often during waking hours (e.g., during the day) than at night and/or the ignitor 110 may be triggered more often when a user is expected to be outside of his home than when he is expected to be home. For example, the controller 114 may include a real time clock to facilitate such timed actions. Alternatively or additionally, automatic triggering of the ignitor may depend on other sensors for example a movement sensor and/or a GPS position sensor (for example the device may not ignite in certain locations) and/or a gyro (for example the device may wait and ignite only when it is right side up). Optionally, the timing mechanism may continue to cycle through the on state and off state of the duty cycle on a continuous basis, and/or when the on/off switch is in the on position. Alternatively or additionally, the timing cycle may be random and/or include a random component.

Optionally, the timer may cause the ignitor 110 to become energized. For example, the timer and/or the controller 114 may send a signal to the ignitor 110 to energize, and/or a signal to the power supply 108 to energize the ignitor 110. Optionally, the state of the timer output signals may be determined by the logic controller 114.

Interface

Optionally, may comprise a user interface. For example, a mechanical interface may work based on a force applied. The interface 116 may send control signals and/or indicate signals received from the timer and/or the controller 114. Optionally, activating the trigger 102 may allow and/or enable the timer to energize the ignitor 110 and/or power supply 108 during time periods for example as specified below. For example, activating the trigger 102 may close an inactive electrical circuit and/or remove a mechanical block that would otherwise prevent the timing mechanism from closing an electrical circuit.

In some embodiments, a user interface 116 may include a touch screen and/or an interface to allow an external device to be used as a user interface 116. For example, the device may include a communication channel that allows communication with and/or programming via a personal computing device of a user (for example a cell phone). For example, the communication may be via a wireless channel and/or network (e.g., Bluetooth).

Optionally, the output signals may be sent to a user. Optionally, there may be an output interface 116 are determined by the state of the timing mechanism and the logic controller. For example, a trigger and/or timer may include a mechanical toggle switch whose state the user can see. Optionally, a timer output signals may comprise two or more states, for example turn on state and a turn off state and/or a time to the next state which may be displayed. For example, the display may include a screen, a touch screen, and/or a light.

Logic Controller

Optionally, the state of the timer output turn on signal and turn off signal may be determined by the logic controller 114. The logic controller 114 may be a mechanical, electrical, and/or electronic device and/or state machine that determines output signals based on input signals. Optionally, the logic controller 114 may comprise input interfaces from one or more of the mechanical timer, safety 106, and/or the trigger 102 and/or output interfaces to one or more of the power supply 108 and/or the ignitor 110.

Delay/Duty Cycle

Optionally, when the device is holiday mode or shabbat mode, trigger 102 may be prevented from directly starting the ignitor. For example, when the trigger 102 has been activated the logic controller 114 may not to activate the ignitor 110 immediately. For example, the ignitor 110 may only be activated when the timing mechanism begins a next on state (e.g., if an on state starts with the trigger 102 non-activated, activating the trigger 102 may not cause ignition until the next on state). Alternatively or additionally, when the timing mechanism is in the on state, the timer may inhibit the activation of the trigger 102 and/or may inhibit the trigger 102 from directly and/or immediately cause energizing the ignitor 110. For example, this may avoid transgressing Jewish law prohibition of kindling flame on the Sabbath and/or festivals.

In some embodiments, releasing the trigger 102 may not deactivate the ignitor 110 immediately. For example, releasing the trigger may have no effect (e.g., releasing the trigger while the ignitor 110 is activated may have no effect and/or the ignitor 110 may be deactivated at the next off state of the logic controller 114 whether or not the trigger 102 is active). Alternatively or additionally, releasing the trigger 102 may cause the ignitor 110 to be deactivated after a time interval (that may be fixed and/or random). Optionally a user may be informed of the time to deactivation, for example through a message on an output screen and/or an audio signal and/or a message sent to a computing device of the user. Alternatively or additionally, releasing and/or deactivating the trigger 102 may immediately cause deactivation of the ignitor.

Optionally the logic controller 114 changes output state from turn on to turn off as a result of an event. For example, the event may be a set amount of time has elapsed, the timing mechanism changes its state from on to off one or more times, the timing mechanism changes its state from off to on one or more times, the trigger 102 is deactivated, the safety 106 is activated, and/or any other trigger event detectable by the controller 114. In some embodiments, the device will activate the ignitor 110 without regard to the state of a trigger 102. For example, the ignitor may be activated based on time and/or randomly.

In some embodiments, activating the trigger 102 may cause ignition of the ignitor 110 only after a fixed and/or random time delay. For example, trigger 102, may be any kind of switch and/or button. On Holiday mode, the trigger 102 may trigger a timer that causes delayed activation of the ignitor 110. For example, the delay may range between 0.5 to 1 second and/or between 1 to 10 seconds and/or between 10 to 100 seconds. Optionally, once activated, in holiday mode, the ignitor 110 will remain in an activated state without regard to the state of the trigger (for example, the ignitor 110 may stay activated for a fixed and/or random time). Alternatively, activating the trigger 102 may activate the ignitor 110 when the device is in an on state, but not when the device is at an off state. Optionally the off and on states may change randomly and/or based on time delays and/or based on other factors.

Ignitor

Optionally, the ignitor 110 may be any manner of heating element and/or spark generator and/or ionization source and/or arc source and/or electrical discharge source. For example, the ignitor may be electrically powered. Optionally, the ignitor 110 is capable of being activated and/or deactivated with the shield of the device open and/or closed. For example, the ignitor 110 may not require air and/or may activate with a cover of the device closed. For example, the ignitor 110 may electrical.

Optionally, the ignitor 110 may comprise a resistive heating element, for example a coiled metal element.

Optionally, the ignitor 110 may comprise a radiative heater, for example an infrared and/or incandescent element. Optionally the ignitor 110 may include a plasma generator.

Optionally, the ignitor may comprise a mechanism for generating sparks, for example to ignite flammable gas. For example, the ignitor may comprise a plasma generator, a gap spark generator, a flint based spark mechanism, a friction based sparking device, and/or any other type of mechanism for generating a spark.

Geometry and/or Casing

Optionally, the ignitor 110 and/or any portion thereof may be shaped, formed and/or constructed as a wire, a ribbon, a film, a pair of electrodes and/or any other profile and/or shape and/or geometry.

Optionally, the shape of the ignitor 110 and/or any portion thereof may be substantially straight, coiled, and/or any other shape. Optionally the ignitor 110 and/or any portion thereof may be encased and/or insulated in a shielding. For example, the shielding may include an electrical insulator, a heat conducting casing, and/or any other type of encasing of a heating element. Alternatively or additionally, the shape of the ignitor and/or the shielding may have decorative and/or symbolic significance (for example, a plasma source (e.g., electrodes) may form an arc having the shape of a star of David.

Optionally, the ignitor 110 may comprise a spark gap ignitor, a spark plug, and or any other type of spark generator and/or spark generating equipment.

Optionally the ignitor 110 may comprise a metal, for example Nichrome, Kanthal, Cupronickel, and/or any other metal used to form a heating element.

Optionally, the ignitor 110 may include a heating element comprising a ceramic, semiconductor, thick film, and/or polymer PTC. Optionally, the ignitor 110 may be a composite heating element, for example a tubular and/or sheathed element, screen printed metal-ceramic, Optionally, the ignitor 110 may comprise a power supply, either as an integrated unit or as connectible modules.

Applications

In some embodiments, a lighter may be designed for lighting a particular object, for example, a cigarette. Optionally, a lighter is designed to be small enough to carry in a pocket (e.g., weigh less than 50 g and/or between 50 to 100 g and/or between 100 to 200 g and/or between 200 to 500 g and/or the lighter may have a long dimension (e.g., a length) of less than 2 cm and/or between 2 to 5 cm and/between 5 to 10 cm and/or between 10 to 20 cm. Optionally, device may have a short dimension (e.g., a thickness) of less than 0.5 cm and/or between 0.5 to 1 cm and/or between 1 to 3 cm between 3 to 5 cm. For example, a lighter may include a slot and/or indentation into which a tip of the cigarette and/or another object to be ignited is inserted. For example, the slot and/or indentation may have a depth of less than 1 mm and/or between 1 to 5 mm and/or between 5 to 20 mm and/or between 20 50 mm. Optionally the slot and/or indentation may have a with of less than 5 mm and/or between 5 to 10 mm and/or between 10 to 20 mm. Optionally, an object (e.g., the tip of a cigarette and/or a tip of a match) is inserted into the slot or indentation to contact an ignitor e.g., plasma, a flame and/or hot surface. Alternatively or additionally, a lighter may emit and/or generate a spark and/or a stream of a flammable gas and/or a stream of hot material and/or a stream of charged material (for example plasma).

In some embodiments, a lighter may be configured for lighting a stove and/or a match. For example, a stove lighter may be designed to sit on a surface (e.g., a counter) and/or light a flame transferring object (e.g., a match). Alternatively or additionally, a stove lighter may have the form of elongated stick with the lighting element distanced from a handle and/or trigger. For example, the length of the elongated stick may range between 1 to 3 cm and/or between 3 to 6 cm and/or between 6 to 15 cm and/or between 15 to 30 cm. In some embodiments, a stove lighter may include a plasma lighter and/or a spark lighter and/or a flame. Alternatively or additionally, a stove lighter may be built into a stove.

Ignitor Interfaces and/or States

Optionally, the ignitor 110 is connected to one or more of a timer, trigger 102, a logical controller 114, a safety and/or a power supply 108. Optionally, the ignitor 110 has two or more states for example including on and off. When the ignitor 110 is in the on state, the ignitor 110 is optionally energized by power from the power supply 108, for example to heat the ignitor and/or to cause the ignitor to generate a spark and/or to generate a plasma. When the ignitor 110 is in the off state, the power supply 108 is optionally prevented from energizing the ignitor 110, for example preventing the ignitor 110 from heating and/or generating a spark and/or generating plasma. The state of the ignitor 100 is optionally determined by one or more of the timer, trigger 102, logic controller 114, safety 106 and power supply 108.

Shield

In some embodiments, the ignitor comprises a shield 112. Optionally, the shield 112 at least partially surrounds the ignitor 110. The shield 112 may be in contact with the ignitor 110 or portions thereof, and/or the shield 112 may be separated by a gap (e.g., air) from contact with the ignitor 110. In some embodiments, the shield 112 may comprise a window, slot, and/or hole, referred to herein as the slot, which may allow inserting an object to proximity and/or contact with the ignitor 110. For example, when the ignitor 110 is in the turned on state, a cigarette may be inserted through the slot and ignited by the ignitor 110. Optionally, the shielding 112 may have a closed configuration, wherein the ignitor is protected (for example, the cigarette and or another objection may be prevented from coming into contact and/or proximity of the ignitor.

In some embodiments of the present invention, the lighter further comprises a base, for example an element with a flat surface and weight similar to or greater than the weight of the ignition device. The base may allow the device to be placed in a standing upright position on a flat surface, for example a kitchen counter top.

In some embodiments, the interface between the trigger 102 and the timer is mediated by the safety 106. For example, when the safety 106 when activated, interaction may be inhibited between the trigger 102 and the timer 104. Optionally, the output of the timer to the power supply 108 is inhibited. For example, the power supply 108 may begin supplying power to the ignitor 110 in response to a signal from the controller 114. Alternatively or additionally, the power supply 108 may stop supplying power to the ignitor 110 in response to a turn off signal from the timer.

Figure 3A:
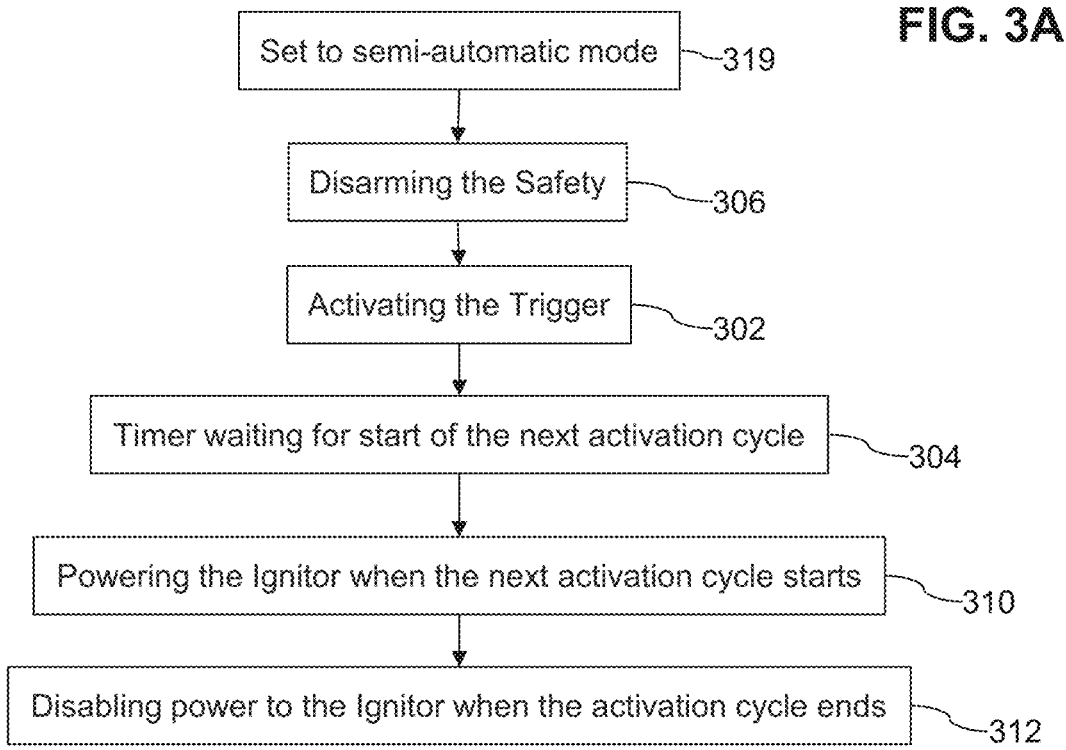
FIG. 3A is a flow chart illustration of method of using an ignition device in a semi-automatic mode in accordance with an embodiment of the current invention.

FIG. 3A is a flow chart illustration of method of using an ignition device in a semi-automatic mode in accordance with an embodiment of the current invention. Optionally, the method of using an ignition device to ignite a substance comprises all or some of the following steps, not necessarily in the following order. Optionally before shabbat and/or a holiday the device may be set 319 to a semi-automatic state. Setting the state may optionally include preprogramming a schedule of repeated on and off states during the holiday or shabbat. For example, the on and off states may be dependent on time and/or other factors that are not in direct control of the user on shabbat or the holiday. Optionally, disarming 306 a safety facilitates a activating a trigger to signal to a timer. For example, signals from the timer to the trigger to the timer may be inhibited until the safety is disarmed 306 and/or the timer may be deactivated until the safety is disarmed 306. Additionally or alternatively, activating 302 the trigger may cause a signal to be sent to the timer. For example, the trigger may cause the timer to begin a timing operation. Optionally, the timer may be delaying 304 activating the ignitor until the end of the timing operation. Activation 310 of the ignitor may be result directly from the timer and/or indirectly, for example as described above. For example, the timer causes a powering and/or activating 310 of the ignitor when the delaying period has ended, thereby causing the ignitor to be energized 310 and/or capable of igniting combustible substances. The timer may continue to cause the ignitor to be energized 310 until an event causes the timer to cease 312 energizing the ignitor. For example, the event may be an elapse of a period of time, release of the trigger, and/or any other event, for example as described herein above or below.

Figure 3B:
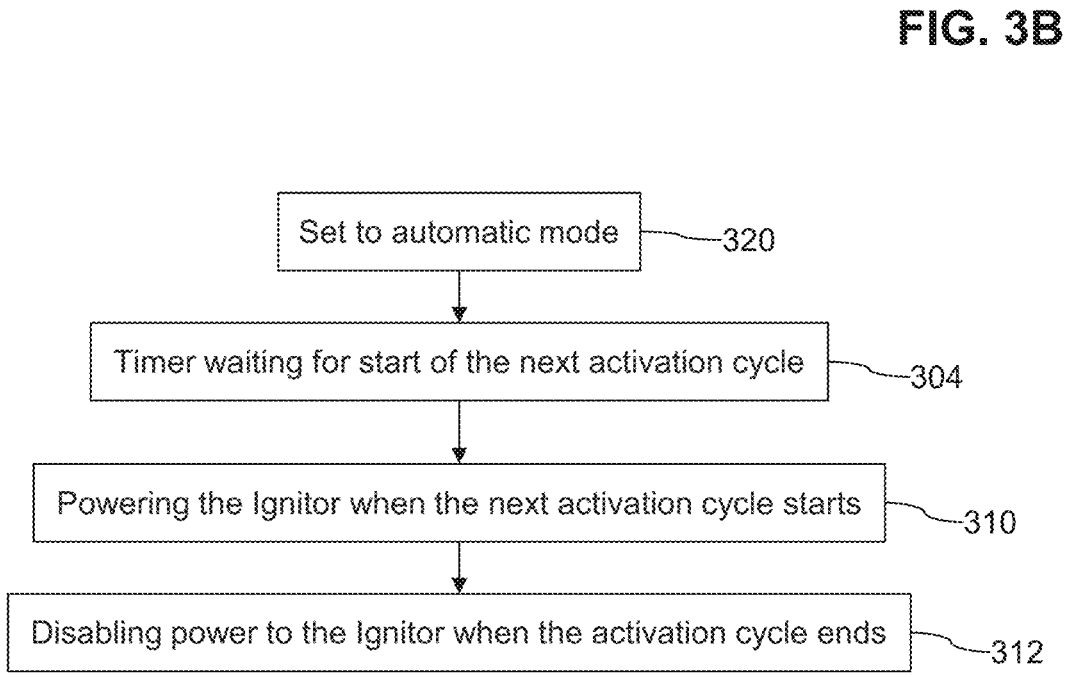
FIG. 3B is a flow chart illustration of method of using an ignition device in an automatic mode in accordance with an embodiment of the current invention.

FIG. 3B is a flow chart illustration of method of using an ignition device in an automatic mode accordance with an embodiment of the current invention. Optionally, the method of using an ignition device to ignite a substance comprises all or some of the following steps, not necessarily in the following order. Optionally, before shabbat and/or the holiday, the device Set 320 in automatic mode. Setting the automatic mode may optionally include preprogramming a schedule of repeated on and off states during the holiday or shabbat. For example, the on and off states may be dependent on time and/or other factors that are not in direct control of the user on shabbat or the holiday. For example, the automatic mode may allow a timer to activate 310 the ignitor regardless of the presence or state of a trigger. The timer may begin a timing operation and/or wait for an activation cycle. Upon the beginning of the activation cycle, timer optionally causes a activation 310 of the ignitor, for example causing the ignitor to be energized and capable of igniting combustible substances. The timer may continue to cause the ignitor to be activated 310 until an event. For example, after the event, the timer to optionally, ceases 312 energizing the ignitor (e.g., deactivating the ignitor). The event may include elapse of a period of time and/or a random event (for example a random time period and/or a random state) and/or any other event for example as described herein above or below.

Optionally, the method further comprises the steps of inserting a flammable material, for example a cigarette, into a slot in the shield surrounding the ignition device, and removing the flammable material when it has been ignited. Optionally, the flammable material may be inserted while the ignitor is energized. Alternatively or additionally, the flammable material may be inserted before the ignitor is energized. Optionally, a user may be informed (exactly or approximately) when the ignitor is to be energized 310).

Optionally, the method further comprises the step of introducing a flammable gas to the proximity of the ignition device and the ignitor generating a spark thereby igniting the flammable gas.

Figure 4:
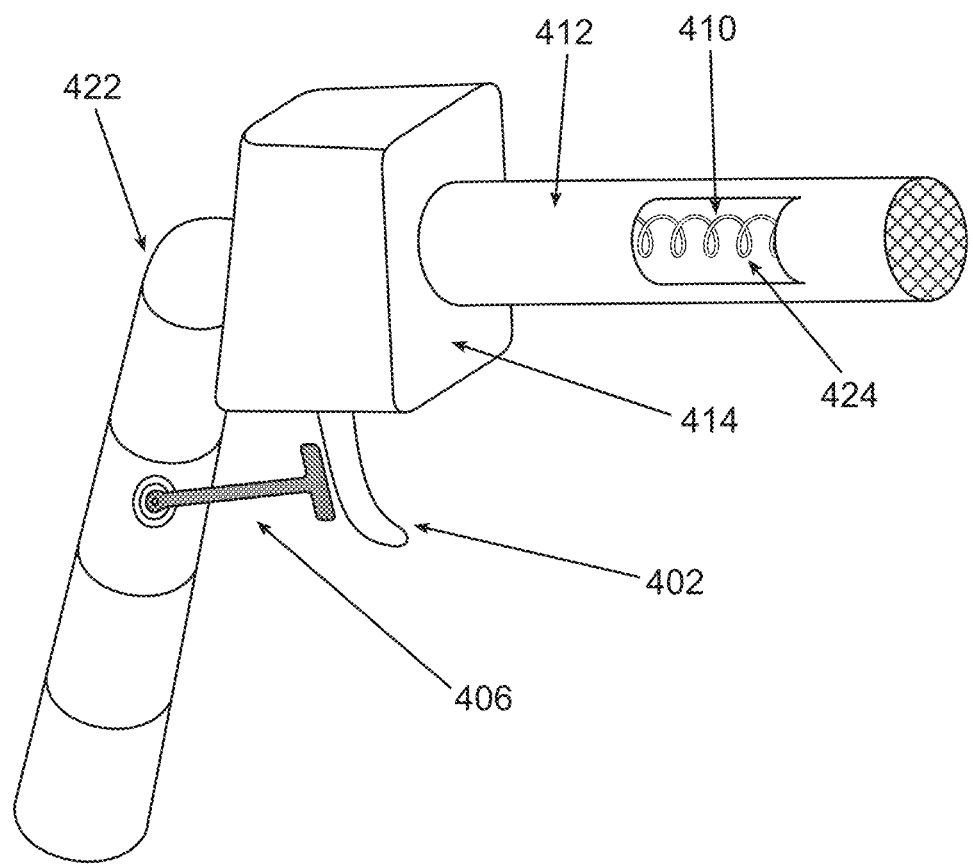
FIG. 4 is a schematic illustration of an ignition device, in accordance with an embodiment of the current invention

FIG. 4 is a drawing illustration of an ignition device, in accordance with an embodiment of the current invention. Optionally, the ignition device further comprises a handle 422. Optionally, the handle 422 may be aligned with the axis of the length of the ignitor 410 and shield 412, forming an axial extension of the ignition device. In this embodiment, the handle 422 and ignitor 410 may comprise the form factor of a wand. Optionally, and opening 424 in the shield 412 allows access to the ignitor 410.

Optionally, the handle 422 may be attached to the ignition device with an adjustable hinge, for example a hinge with frictional and/or discrete positional resistance to change of the hinge angle. For example, the handle 422 may be adjusted to align with the axis of the ignition device in the form factor of a wand, and/or the handle may be adjusted to an acute angle with the ignition device in the form factor of a handgun. Optionally, a safety 406 is included that may prevent activation of the ignitor 410. For example, the safety 406 may inhibit activation of a trigger 402. Optionally, the lighter may have various modes and/or methods of lighting, for example as illustrated in FIGS. 3A and 3B. For example, the lighter light automatically in accordance to a time cycle and/or the device may light directly in response to activating the trigger 402. Alternatively or additionally, the light via a combination of various factors. For example, activating the trigger may activate a logic controller 414. For example, controller 414 and/or a random element that will activate a timer and/or a random element that will cause the ignition after a fixed and/or random delay.

Figure 5:
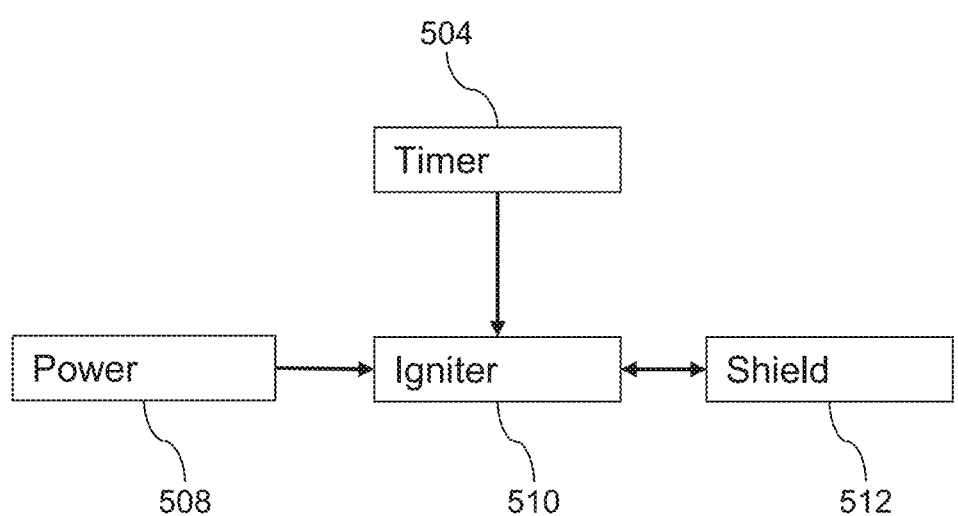
FIG. 5 is a block diagram of untriggered mode lighter in accordance with an embodiment of the current invention.

FIG. 5 is a block diagram of untriggered automatic mode lighter in accordance with an embodiment of the current invention. In some embodiments, a lighter may be activate automatically (for example at intervals and/or according to a timer 504) without a user action. For example, the lighter may include a shield 512, a power source 508 and/or a safe ignitor 510 such a plasma that will be safe even if it is activated in a user's pocket. Optionally, the ignitor 510 may be activated and/or deactivated repeatedly on intervals without user intervention. In some embodiments, the lighter may include a logic controller and/or a user interface. For example, the interface may include a display and/or a toggle switch and/or a communication interface. For example, the communication interface may communicate with a personal computing device of a user. Optionally, the user will use the user interface of his computing device as a user interface to adjust settings of the lighter. Optionally any components (the timer 504, the power source 508, the ignitor 510 and/or the shield 512 may be as described in any of the other embodiments described herein). Optionally, the ignitor 510 is capable of being activated and/or deactivated with the shield of the device open and/or closed.

Optionally, the safety 406 comprises a mechanical device that mechanically prevents activating the trigger 402, for example by preventing movement of the trigger 402. Optionally, the lighter may comprise the form factor of a handgun and/or pistol, with a handle 422 and opposing trigger 402, a mechanical safety 406, and/or the shielded ignitor 410 in place of the barrel of a gun. Optionally the handle 422 allows a user to hold and operate the lighter without placing fingers upon and/or in proximity to the ignitor 410.

Figure 6:
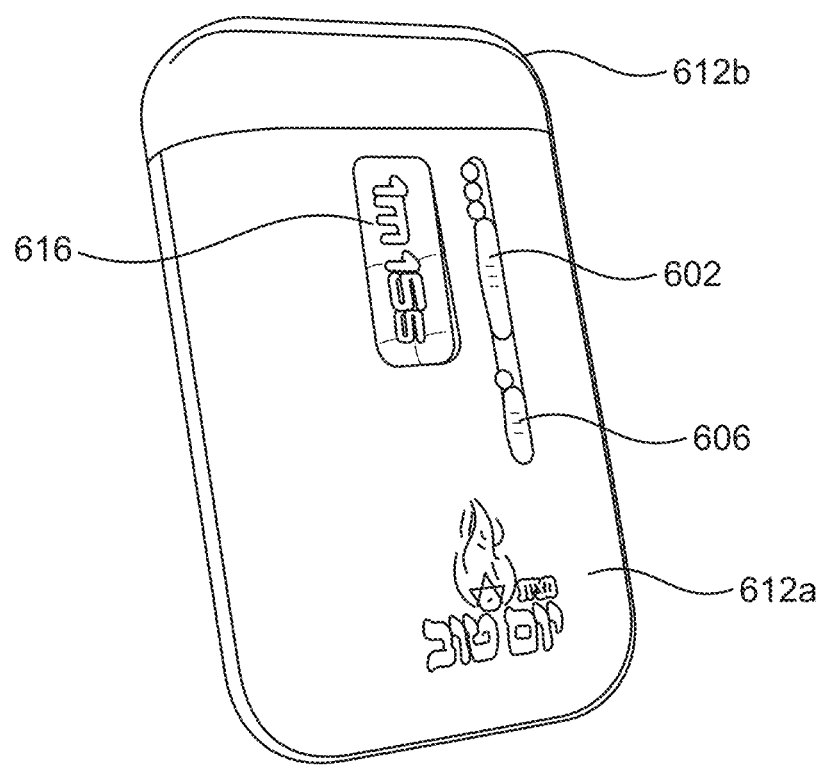
FIG. 6 is a perspective view of a lighter in a closed configuration in accordance with an embodiment of the current invention.

FIG. 6 is a perspective view of a lighter in a closed configuration in accordance with an embodiment of the current invention. In some embodiments, a lighter is designed to fit into a pocket of a user. For example, the dimensions may be as described herein above in the description of FIGS. 1 and 2. Optionally, in the closed configuration the ignitor 610 (e.g., see FIG. 7) is shielded. For example, the lighter may activate and/or deactivate periodically without a user action. Optionally, the ignitor 110 is capable of being activated and/or deactivated with the shield of the device open and/or closed. Nevertheless, the shielding may have a closed configuration in which the lighter will not present a fire hazard. For example, in the closed configuration the ignitor 610 may be surrounded by shielding including a casing 612a and/or a cover 612b. Optionally, the ignitor includes a user output interface, for example a display screen 616. For example, screen 616 may display to a user settings of the lighter (for example the time interval between activation events) and/or a state of the lighter (for example, the time until the next activation of the ignitor). In the exemplary figure, the display shows that the ignitor will be ignited in one minute and 15 seconds. Optionally, the lighter includes an input interface. For example, the input interface may include a trigger 602 and/or a safety 606. In some embodiments, the trigger 602 and/or safety 606 include state switches. For example, trigger 602 includes a three-way toggle switch (for example, automatic mode, combination mode and/or manual mode) and/or safety 606 includes a two-way toggle switch (for example active and off)). Optionally, trigger 602 and/or safety 606 are protected from accidental changing of settings. For example, trigger 602 and/or safety 606 are sunken into the casing of the lighter.

In some embodiments, a lighter may have multiple modes. For example, a trigger 602 may switch between some or all of a manual mode, a semi-automatic mode and a fully automatic mode. For example, in the manual mode, an ignitor 610 may be ignited and/or shut down directly by a user action. For example, when a user opens the cover 612b the ignitor 610 may be ignited. For example, when the user closes the cover 612b, the ignitor 610 may be shut down. In a semi-automatic mode, the ignitor 610 may be ignited by a combination of an internal state and/or a user action. For example, a timer may shift the lighter between an active (on) state and a non-active (off) state. For example, when the system switches to an active state, when the cover 612b is open, the ignitor may be ignited. When the cover is closed the ignitor 610 may remain deactivated. For example, this means that the lighter is safely shut down as long as the cover is closed. Nevertheless, opening the cover may not constitute a direct cause of lighting, but indirectly lead to the ignition at the beginning of the next on cycle. Other methods of combining user action and automatic functions (for example, including a random state etc. for example as illustrated in FIGS. 3A and 3B herein above) may be programmed to the lighter. For example, this may allow a user to control the ignition of the ignitor while keeping to the limits of Jewish laws on Holidays and/or Shabbat. In a fully automatic mode, the ignitor 610 of the device may ignite and be shut down regardless of user actions (e.g., according to a time schedule, ignited at the beginning of an on state and shut down at the beginning of an off state). Optionally, the ignitor 610 and/or shielding 612a, 612b are configured such that even when the ignitor is ignited while the lighter is in the pocket of a user, it will not present a danger to the user.

In some embodiments, a lighter may include a mechanical, electrical, and/or electronic timing mechanism. Optionally, the timing mechanism include repeated on and off states. For example, the controller 814 may output a signal correlated with a duty cycle of on state and off state. Optionally the duration of the on state and/or the off state may be 1-2 seconds, 2-4 seconds, 4-6 seconds, 6-8 seconds, 8-10 seconds, 10-15 seconds, 15-30 seconds, and/or longer than 30 seconds. Optionally, the off state may last longer than the on state for example to between 2 to 10 times as long and/or between 10 to 100 times as long and/or between 100 to 1000 times as long and/or between 0.1000 to 10000 times as long and/or between 10,000 to 100,000 times as long. For example, the off state may last between 1 minute to 30 minutes and/or between 30 minutes to 2 hours and/or between 2 hours to 12 hours. In some embodiments, the timer may be programmed according to times of day. For example, the ignitor 110 may be triggered more often during waking hours (e.g., during the day) than at night and/or the ignitor 110 may be triggered more often when a user is expected to be outside of his home than when he is expected to be home. Alternatively or additionally, automatic triggering of the ignitor may depend on other sensors for example a movement sensor and/or a GPS position sensor (for example the device may not ignite in certain locations) and/or a gyro (for example the device may wait and ignite only when it is right side up). Optionally, the timing mechanism may continue to cycle through the on state and off state of the duty cycle on a continuous basis, and/or when the on/off switch is in the on position. Alternatively or additionally, the timing cycle may be random and/or include a random component.

Figure 7:
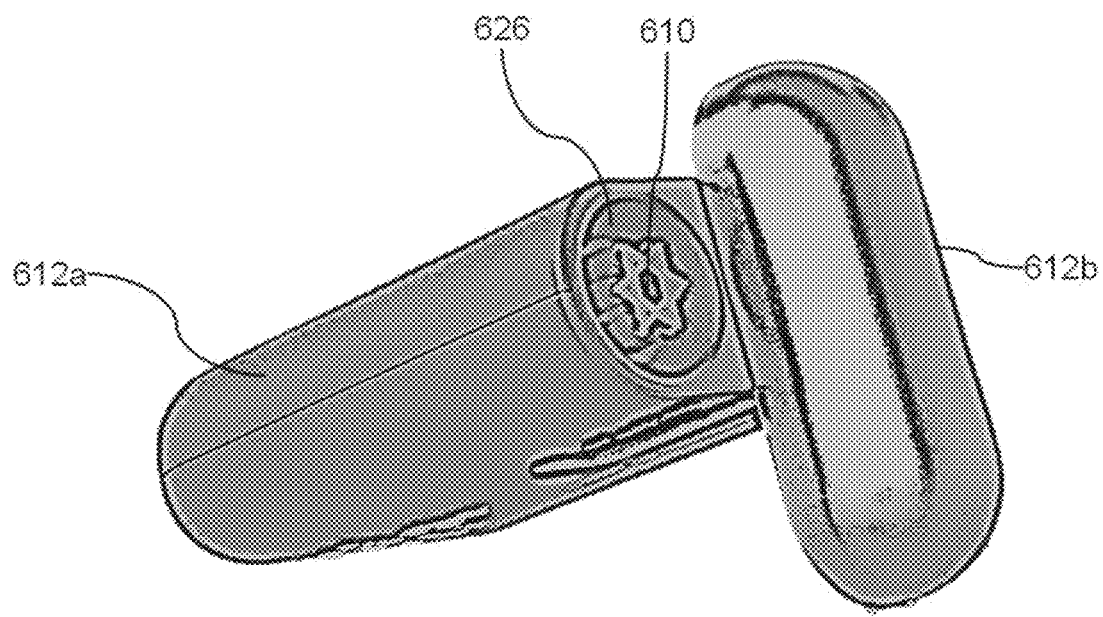
FIG. 7 is a perspective view of a lighter in an open configuration in accordance with an embodiment of the current invention.

FIG. 7 is a perspective view of a lighter in an open configuration in accordance with an embodiment of the current invention. In some embodiments, an ignitor 610 is positioned in a shielded position (for example inside an indentation 626 in a shielding 612a). Optionally, when a cover 612b is open, an opening to the indentation 626 is revealed and/or a flammable object (e.g., a cigarette tip) may be into the indention 626 to contact the ignitor 610 and/or be ignited when the ignitor is active. Optionally, when cover 612b is closed, ignitor 610 may be completely surrounded by shielding 612a, 612b and/or the device may safe from igniting outside objects (for example, the lighter may be safely held in a pocket of a user even when the ignitor is in an ignited state).

In some embodiments, an ignitor includes a plasma source. For example, the ignitor may have multiple electrodes that create an arc when energized by a power source. For example, the electrodes may be positioned such that the arc has an appearance enhancing form (e.g., a hexagram).

In some embodiments, a lighter may be designed for lighting a particular object, for example, a cigarette. Optionally, a lighter is designed to be small enough to carry in a pocket (e.g., weigh less than 50 g and/or between 50 to 100 g and/or between 100 to 200 g and/or between 200 to 500 g and/or the lighter may have a long dimension (e.g., a length) of less than 2 cm and/or between 2 to 5 cm and/between 5 to 10 cm and/or between 10 to 20 cm. Optionally, device may have a short dimension (e.g., a thickness) of less than 0.5 cm and/or between 0.5 to 1 cm and/or between 1 to 3 cm between 3 to 5 cm. For example, a lighter may include a slot and/or indentation into which a tip of the cigarette and/or another object to be ignited is inserted. For example, the slot and/or indentation may have a depth of less than 1 mm and/or between 1 to 5 mm and/or between 5 to 20 mm and/or between 20 50 mm. Optionally the slot and/or indentation may have a width of less than 5 mm and/or between 5 to 10 mm and/or between 10 to 20 mm. Optionally, an object (e.g., the tip of a cigarette and/or a tip of a match) is inserted into the slot or indentation to contact an ignitor e.g., plasma, a flame and/or hot surface. Alternatively or additionally, a lighter may emit a spark and/or a stream of flammable gas and/or a stream of hot material and/or a stream of charged material (for example plasma).

Figure 8:
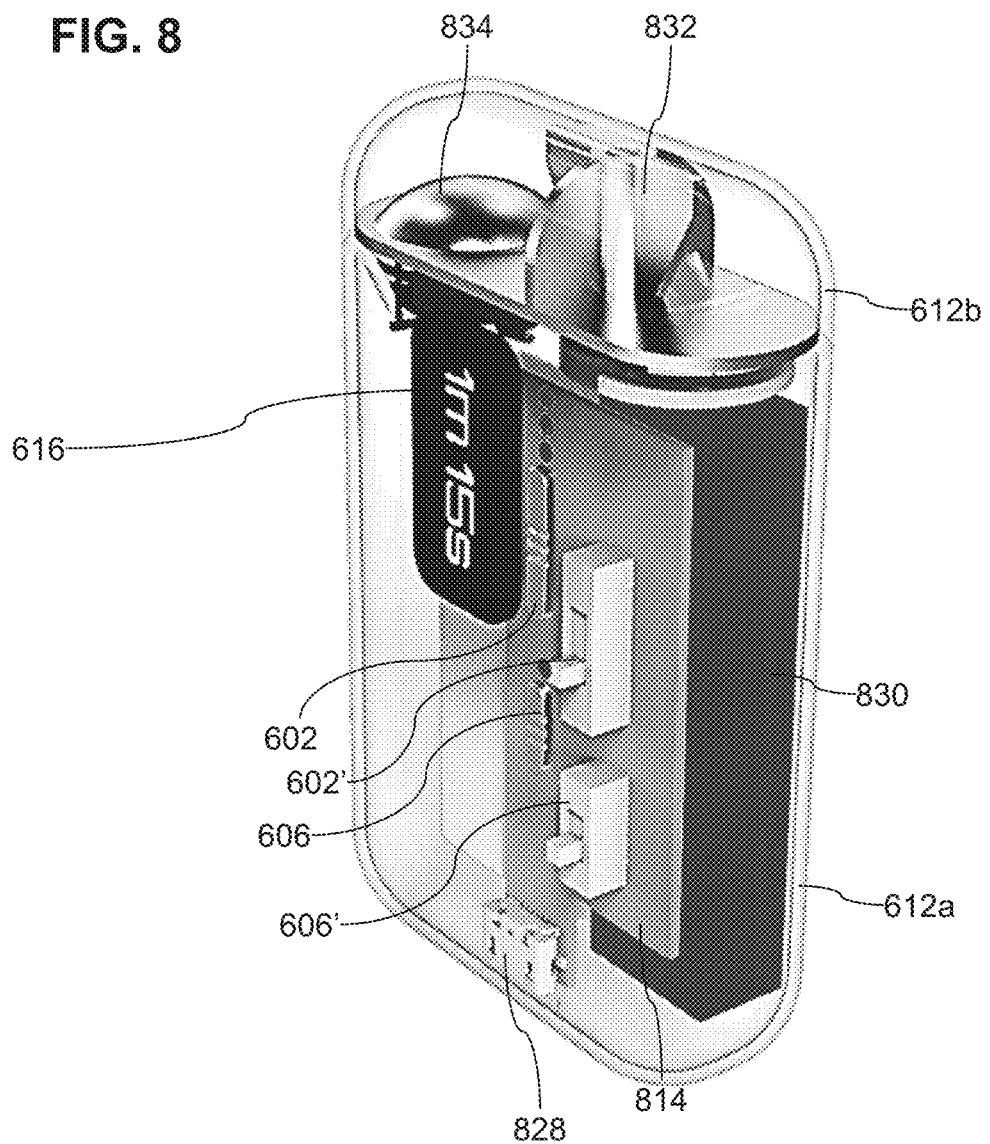
FIG. 8 is a perspective view of a lighter showing internal structure in accordance with an embodiment of the current invention

FIG. 8 is a perspective view of a lighter showing internal structure in accordance with an embodiment of the current invention. In some embodiments, a cover includes a linkage mechanism 832 for holding the cover open and/or closed when open or closed by a user. Cover 612b may include an insulator 834 to prevent the ignitor from damaging or igniting the lighter and/or external objects. In some embodiments, a logical controller 814. For example, the controller may include an integrated circuit mounted on a semiconductor chip. Optionally, the chip may include mounted thereon toggle switches 602' and 606' (which may be connected for example, to a trigger 602 and/or a safety 606). Additionally or alternatively, the chip may be connected to a battery 830 and/or a charger port 828.

Optionally, the controller 814 may be programmable. For example, the user interface may be used to place the device in a programming mode. For example, in the programming mode, a user may adjust the time of lighting in the automatic and/or semi-automatic modes. Optionally, the time may be fixed and/or have a random component. Alternatively or additionally, the controller 814 may be placed in communication with an external user interface. For example, the charging port 828 may also include a communication port for hardwired communication and/or the controller 814 may include a wireless transceiver. For example, the controller 814 may communicate with an external device for example including a personal computing device of a user (e.g., a cell phone and/or a personal computer) and/or a communication network. Optionally, a user may user the external device (for example through an application on his cell phone) to program the controller 814. For example, the user may set various conditions for activating an ignitor 614 in an automatic and/or semiautomatic mode (for example, depending on a time of day, a day of the week, an environmental condition (e.g., temperature, light, electrical fields), an orientation of the lighter).

It is expected that during the life of a patent maturing from this application many relevant technologies (e.g., ignitors, controllers, insulating materials) will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for ignition comprising:
   an ignitor configured to ignite an object when said object is brought into proximity of said ignitor while the ignitor is in an activated state;
   an energy source for supplying energy to said ignitor to reach said activated state;
   a shielding housing said ignitor and said energy source, said shielding having a closed configuration inhibiting bringing said object into proximity with said ignitor;
   a logic controller configured for activating said ignitor according to a preprogrammed schedule.

2. The system of claim 1, wherein said ignitor is configured for activation regardless of whether said shielding is in said configuration or said closed configuration.

3. The system of claim 2, wherein said logic controller is configured for said activating in accordance with said schedule regardless of where said shielding is in an open configuration facilitating bringing said object into proximity with said ignitor or closed configuration.

4. The system of claim 2, wherein said logic controller is configured for repeated said activating and deactivating said ignitor in accordance with said schedule over a period of 24 hours without intervention of a user.

5. The system of claim 1, wherein said object is a tip of a cigarette.

6. The system of claim 5, wherein said shielding includes an indentation and wherein said ignitor is locating inside said indentation.

7. The system of claim 6, wherein said shielding includes a cover and where in said closed configuration said cover blocks an opening of said indentation inhibiting bringing said object into proximity with said ignitor and wherein in an open configuration said cover allows access to said ignitor via said opening.

8. The system of claim 1, further comprising:
   an output interface configured for informing a user of a preprogrammed ignition event before the ignition event.

9. The system of claim 1, wherein said logic controller is configured for performing said activating when said shielding is in an open configuration inhibiting bringing said object into proximity with said ignitor and for inhibiting said activating when said shielding is in said closed configuration.

10. The system of claim 1, wherein said logic controller is configured for at least two modes, a first mode wherein said schedule is preprogrammed and a second manual state where said activating is according to a current action of a user.

11. The system of claim 10, wherein in said manual state opening said shielding activates said ignitor and closing said shielding deactivates said ignitor.

12. The system of claim 10, further comprising a trigger and wherein in said manual state activating said trigger activates said ignitor and deactivating said trigger deactivates said ignitor.

13. The system of claim 1, further comprising a trigger and wherein said logic controller is configured for performing said activating when said trigger is activated and for inhibiting said activating when said trigger is not activated.

14. The system of claim 1, wherein said ignitor includes a plasma source.

15. The system of claim 1, wherein said shielding is sized and shaped to fit into a pocket of a user.

16. The system of claim 1, further comprising an input interface configured for a user to program said schedule.

17. A method of igniting in accordance with Jewish law on a Jewish holiday comprising:

supplying an ignition system including an ignitor and a shielding in a closed state inhibiting access of an object for igniting by said ignitor;

preprogramming said ignition system for repeatedly activating and deactivating an ignitor over said holiday according to a schedule preprogrammed before said holiday;

opening said shielding during said holiday to facilitate said access;

igniting said object during said holiday while said shielding is open and said ignitor is activated according to said schedule.

18. The method of claim 17, further comprising inhibiting said activating when said shielding is in a closed state inhibiting bringing said object into proximity with said ignitor and facilitating said activating when said shielding is in an open configuration.

19. The method of claim 18, further comprising closing said shielding while said ignitor is activated and wherein said activator remains activated while said shielding is in said closed state after said closing.

20. The method of claim 17, wherein said system includes a trigger and further comprising inhibiting said activating when said trigger is deactivated and facilitating said activating when said trigger is activated.

\* \* \* \* \*